(12) United States Patent
Folberth et al.

(10) Patent No.: US 9,483,601 B2
(45) Date of Patent: Nov. 1, 2016

(54) CIRCUIT ROUTING BASED ON TOTAL NEGATIVE SLACK

(71) Applicant: International Business Machines Corporation, Armonk, NY (US)

(72) Inventors: Harald D. Folberth, Boeblingen (DE); Sven Peyer, Tuebingen (DE); Sourav Saha, Kolkata (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/666,416

(22) Filed: Mar. 24, 2015

(65) Prior Publication Data

US 2016/0283637 A1    Sep. 29, 2016

(51) Int. Cl.
*G06F 17/50*    (2006.01)

(52) U.S. Cl.
CPC ....... *G06F 17/5077* (2013.01); *G06F 17/5081* (2013.01); *G06F 17/5072* (2013.01)

(58) Field of Classification Search
CPC .......... G06F 17/5077; G06F 17/5081; G06F 17/5072
See application file for complete search history.

(56) References Cited

U.S. PATENT DOCUMENTS

| | | | | |
|---|---|---|---|---|
| 6,415,426 B1 * | 7/2002 | Chang | ................ | G06F 17/5072 716/113 |
| 6,591,407 B1 * | 7/2003 | Kaufman | ............ | G06F 17/5068 716/114 |
| 6,622,291 B1 * | 9/2003 | Ginetti | ................ | G06F 17/5045 716/108 |
| 6,886,147 B2 * | 4/2005 | Johnson | ................ | G06F 17/505 716/114 |
| 6,886,152 B1 | 4/2005 | Kong | | |
| 7,111,268 B1 | 9/2006 | Anderson et al. | | |
| 7,149,999 B2 * | 12/2006 | Kahng | ................ | G06F 17/5068 716/52 |
| 7,191,417 B1 * | 3/2007 | Luo | ...................... | G06F 17/5045 716/113 |
| 7,219,048 B1 * | 5/2007 | Xu | ...................... | G06F 17/5031 703/19 |
| 7,222,311 B2 | 5/2007 | Kaufman et al. | | |
| 7,251,800 B2 * | 7/2007 | McElvain | ........... | G06F 17/5031 716/112 |
| 7,454,731 B2 * | 11/2008 | Oh | ...................... | G06F 17/5022 716/113 |
| 7,484,194 B2 * | 1/2009 | Gregory | .............. | G06F 17/5031 703/13 |
| 7,853,915 B2 * | 12/2010 | Saxena | ............... | G06F 17/5077 703/13 |

OTHER PUBLICATIONS

Luo et al., "Total Power Optimization Combining Placement, Sizing and Multi-Vt Through Slack Distribution Management", pp. 352-357, © 2008 IEEE.

(Continued)

*Primary Examiner* — Naum B Levin
(74) *Attorney, Agent, or Firm* — Steven F. McDaniel

(57) ABSTRACT

A method, executed by a computer, for routing a circuit includes partitioning a netlist for a circuit into a plurality of nets, determining, for each net of the plurality of nets, a corresponding net cone to provide a corresponding plurality of net cones, computing a total negative timing slack for each net cone of the corresponding plurality of net cones, assigning routing constraints for the plurality of nets according to the total negative timing slack for the corresponding plurality of net cones, and routing the netlist according to the routing constraints. Examples of routing constraints include a routing priority, a routing weight, a scenic ratio, a wire code assignment, and a layer assignment. A corresponding computer program product and computer system are also disclosed herein.

13 Claims, 5 Drawing Sheets

(56) References Cited

U.S. PATENT DOCUMENTS

| | | | |
|---|---|---|---|
| 8,028,260 B1 | 9/2011 | Ravi | |
| 8,255,860 B1* | 8/2012 | Fung | G06F 17/505 716/108 |
| 8,316,339 B2* | 11/2012 | Iyer | G06F 17/505 716/132 |
| 8,527,920 B1* | 9/2013 | Choudhury | G06F 17/505 716/104 |
| 8,621,408 B2 | 12/2013 | Iyer et al. | |
| 8,635,577 B2 | 1/2014 | Kazda et al. | |
| 8,707,241 B2* | 4/2014 | Mottaez | G06F 17/5045 716/132 |
| 8,788,995 B1* | 7/2014 | Kumar | G06F 17/5031 716/110 |
| 8,789,005 B1 | 7/2014 | Umino et al. | |
| 8,806,412 B1 | 8/2014 | Wang et al. | |
| 9,058,456 B2* | 6/2015 | Haller | G06F 17/5036 |
| 9,064,073 B2 | 6/2015 | Mottaez et al. | |
| 2005/0268258 A1* | 12/2005 | Decker | G06F 17/5081 716/104 |
| 2006/0101363 A1* | 5/2006 | Fry | G06F 17/5031 716/103 |
| 2012/0030642 A1* | 2/2012 | Mottaez | G06F 17/5045 716/134 |
| 2012/0159414 A1 | 6/2012 | Ghanta et al. | |
| 2013/0145336 A1* | 6/2013 | Iyer | G06F 17/505 716/134 |
| 2014/0181779 A1* | 6/2014 | Cao | G06F 17/505 716/134 |

OTHER PUBLICATIONS

Kahng et al., "Timing Closure", Chapter 8, VLSI Physical Design: From Graph Partitioning to Timing Closure, 2011, pp. 221-264, ISBN: 978-90-481-9590-9, <http://www.springer.com/cda/content/document/cda_downloaddocument/9789048195909-c8.pdf?SGWID=0-0-45-1050038-p174013563>.

Folberth et al., "Circuit Routing Based on Total Negative Slack", UPSTO Application No. 14/921,271, IBM DE920140177US2, filed on Oct. 23, 2015, pp. 1-22.

IBM Appendix P, list of IBM patents or patent applications treated as related, Oct. 23, 2015, 2 pages.

* cited by examiner

|  | Slack Range-A | Slack Range-B | Slack Range-C | Slack Range-D |
|---|---|---|---|---|
| 310 → | | | | |
| Length Range-A | Scenic Range-1 | Scenic Range-2 | Scenic Range-3 | Scenic Range-4 |
| Length Range-B | Scenic Range-5 | Scenic Range-6 | Scenic Range-7 | Scenic Range-8 |
| Length Range-C | Scenic Range-9 | Scenic Range-10 | Scenic Range-11 | Scenic Range-12 |
| Length Range-D | Scenic Range-13 | Scenic Range-14 | Scenic Range-15 | Scenic Range-16 |

|  | Slack Range-A | Slack Range-B | Slack Range-C | Slack Range-D |
|---|---|---|---|---|
| 310 → | | | | |
| Length Range-A | Wire Code-1 | Wire Code-2 | Wire Code-3 | Wire Code-4 |
| Length Range-B | Wire Code-5 | Wire Code-6 | Wire Code-7 | Wire Code-8 |
| Length Range-C | Wire Code-9 | Wire Code-10 | Wire Code-11 | Wire Code-12 |
| Length Range-D | Wire Code-13 | Wire Code-14 | Wire Code-15 | Wire Code-16 |

CIRCUIT ROUTING BASED ON TOTAL NEGATIVE SLACK

BACKGROUND OF THE INVENTION

The present invention relates generally to designing electronic circuits such as integrated circuits, and more particularly to routing signal paths for electronic circuits.

Modern integrated circuits often have millions of circuit elements such as gates, latches, and drivers in addition to scores of I/O pins. Each of these circuit elements must be electrically connected to other circuit elements, or to I/O pins, via wires (a.k.a. traces). The process of determining the connection path for the circuit wires is referred to as routing.

Circuit timing is dependent on the length and path of the selected route for each wire. Consequently, circuit timing must be considered when routing a circuit. An initial timing analysis for an un-routed circuit may assume an optimal routing such as a 'Steiner' routing for each path in the circuit based on horizontal and vertical channels. The timing analysis may compute a slack for each path in the circuit that is the difference of a desired arrival time (which may include a timing margin) and the estimated arrival time. A positive slack implies that the arrival time at a node can be increased without affecting the overall delay of the circuit. Conversely, a negative slack implies that a signal path is too slow, and the signal path must be sped up.

SUMMARY

A method, executed by a computer, for routing a circuit includes partitioning a netlist for a circuit into a plurality of nets, determining, for each net of the plurality of nets, a corresponding net cone to provide a corresponding plurality of net cones, computing a total negative timing slack for each net cone of the corresponding plurality of net cones, assigning routing constraints for the plurality of nets according to the total negative timing slack for the corresponding plurality of net cones, and routing the netlist according to the routing constraints. Examples of routing constraints include a routing priority, a routing weight, a scenic ratio, a wire code assignment, and a layer assignment. A corresponding computer program product and computer system are also disclosed herein.

BRIEF DESCRIPTION OF THE DRAWINGS

FIGS. 3A and 3B are tables that show how various circuit parameters can be used to determine routing constraints;

DETAILED DESCRIPTION

The embodiments disclosed herein reduce the need for timing cleanup changes when routing circuits such as integrated circuits.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Figure 1:
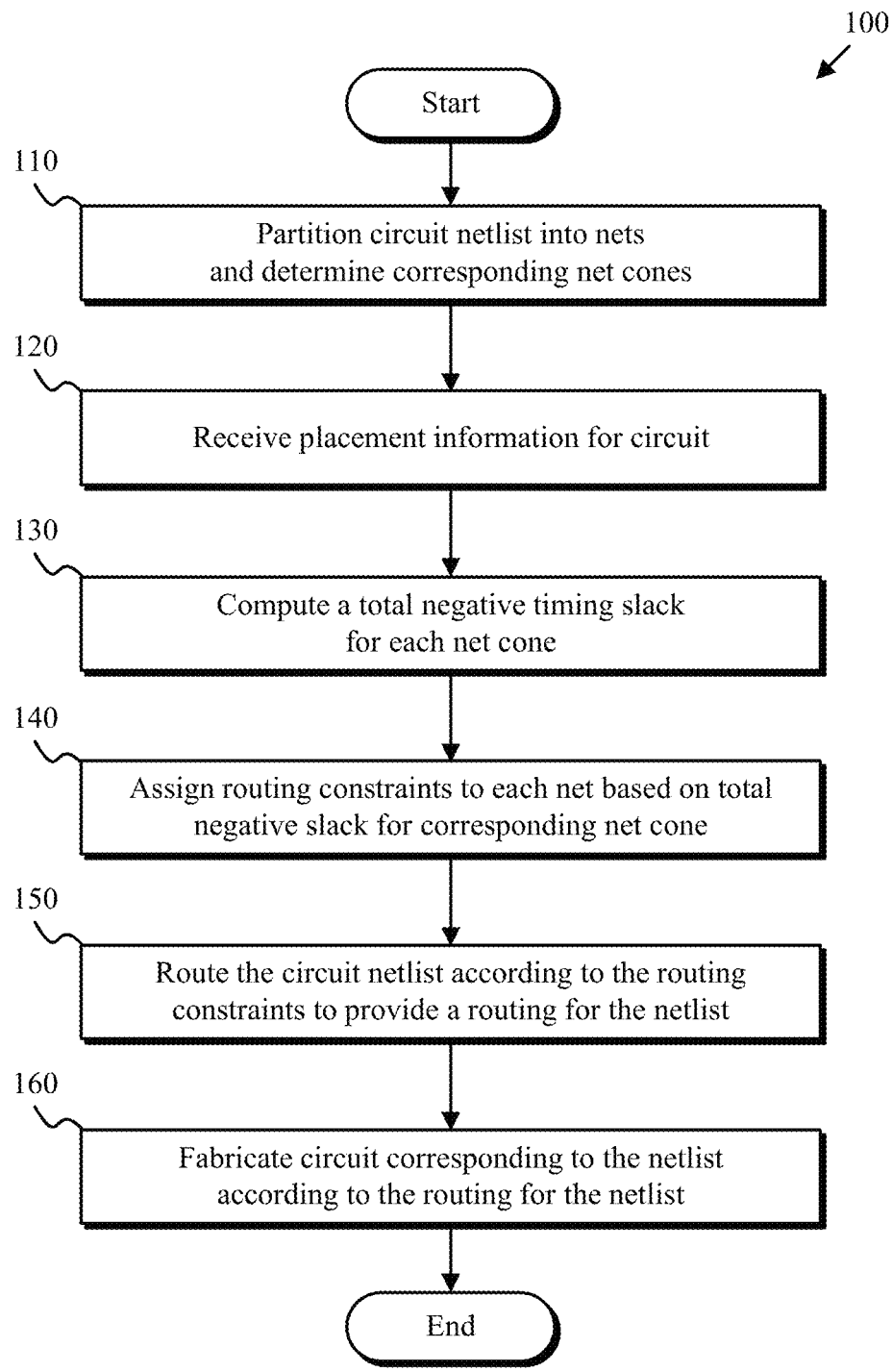
FIG. 1 is flowchart of one embodiment of a circuit routing method in accordance with the present invention.

FIG. 1 is flowchart of one embodiment of a circuit routing method 100 in accordance with the present invention. As depicted, the circuit routing method 100 includes partitioning (110) a circuit netlist, receiving (120) placement information, computing (130) a total negative timing slack, assigning (140) routing constraints, routing (150) the circuit netlist, and fabricating (160) a circuit. The circuit routing method 100 enables circuit routing that reduces the total amount of negative timing slack in the routed circuit and thereby reduces the need for timing cleanup changes.

Partitioning (110) a circuit netlist may include partitioning the circuit netlist into nets and determining a corresponding net cone for each net. In some embodiments, each net corresponds to a driver that supplies a signal to the net. The driver may be associated with an output of a circuit element, an input pin for the circuit, or the like. The net cone for a net may encompass every path in the circuit that propagates the driver output to an output pin for the circuit or an input for a latch.

Receiving (120) placement information may include receiving information from a placement engine or the like, as to the best expected placement for the circuit elements. The placement information may indicate the expected best location of each circuit element (e.g., logic gate or latch) in the circuit. The placement information may correspond to an initial placement for a circuit or a subsequent placement that attempts to improve on the initial placement.

Computing (130) a total negative timing slack may include summing the negative slack values for all the paths in a net cone. Non-negative slack values may be omitted from the summation or set to zero. A total negative timing slack may be computed for each net cone. For an initial placement, Steiner routings paths may be assumed when summing the negative slack values. In some embodiments, computing (130) a total negative timing slack includes subtracting a slack target (e.g., a timing margin) from an estimated timing slack for each path in the net cone.

Assigning (140) routing constraints may include assigning routing constraints to each net based (partially or fully) on the total negative slack for the corresponding net cone. Examples of routing constraints include routing priority, routing weight, scenic ratio, wire code assignment, and layer assignment. In one embodiment, a mapping function is used to map total negative slack to a set of routing constraints.

Routing (150) the circuit netlist may include routing the circuit netlist according to the routing constraints to provide a routing for the netlist. The routing may be an electronic file that indicates where various wires and vias are placed along with the shape or dimensions of the wires and vias. The electronic routing file may conform to a design standard such as OpenAccess.

Fabricating (160) a circuit may include using the routing created by operation 150 to direct a circuit fabrication process. In some embodiments, multiple layers of insolation and wiring are deposited and patterned on a substrate such as a wafer, printed circuit board, or interposer. For example, interconnections provided by the wiring layers may form a number of integrated circuits on a wafer which may be diced and packaged to provide packaged integrated circuits.

Figure 2:
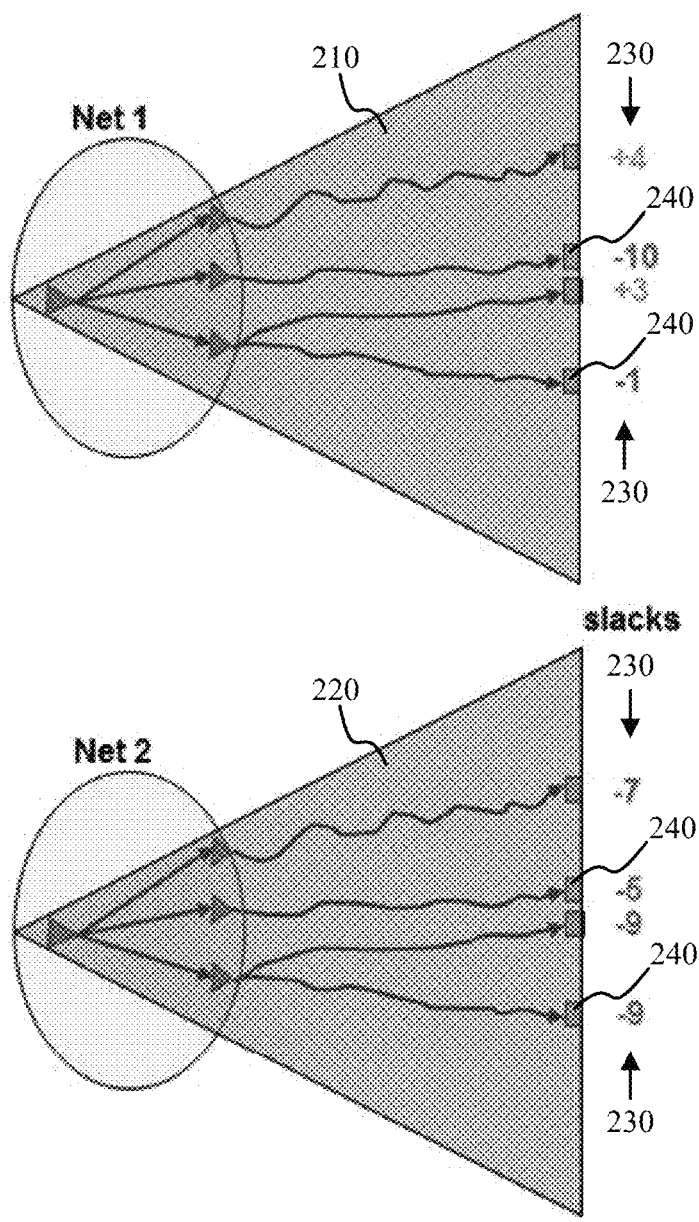
FIG. 2 is a pictorial circuit diagram that illustrates the difference between prioritizing routing according to a most negative slack and a total negative slack.

FIG. 2 is a pictorial circuit diagram that illustrates the difference between prioritizing routing according to a most negative slack and a total negative slack. As depicted, a first net cone 210 and a second net cone 220 may have various slack values 230 for each path in the net cone that corresponds to an output pin or latch 240. With conventional routing, the routing constraints are typically based on the path with the most negative slack which is −10 for the first net cone 210 and −9 for the second net cone 220. Consequently, Net1 would have a higher routing priority than Net2 for conventional routing approaches (assuming that routing priority was used as a constraint by the routing engine). In various embodiments of the present invention, the routing constraints are based on the total negative slack for all of the paths in the net cone. For purposes of summing the total negative slack, paths with a positive slack may be assigned a slack value of zero. Given the foregoing, the total negative slack for Net1 is −11 and the total negative slack for Net2 is −30. Consequently, Net2 would have higher routing priority than Net1 for the various embodiments presented herein.

FIGS. 3A and 3B are mapping tables 300 (i.e., 300A and 300B) that show how various path-based circuit parameters can be used to determine routing constraints. In the depicted embodiments, various slack ranges 310 and routing length ranges 320 (i.e., discretized buckets) are mapped to a scenic range constraint in FIG. 3A and a wire code constraint in FIG. 3B via mapping tables 300A and 300B, respectively. In other embodiments, mapping functions are used instead of mapping tables. The slack ranges may be total negative slack for a net cone. In addition to circuit slack, other circuit parameters may be used to determine routing constraints. For example, the depicted embodiment uses routing length in addition to circuit slack. The longest source to sink path of a net cone is another example of a circuit parameter that can be used to determine routing constraints. Various routing constraints may be determined from the circuit parameters. For example, in addition to the depicted routing constraints of scenic range and wire code, a wide variety of routing constraints can be determined via mapping tables or mapping functions such as routing priority, routing weight, and a layer assignment.

Figure 4A:
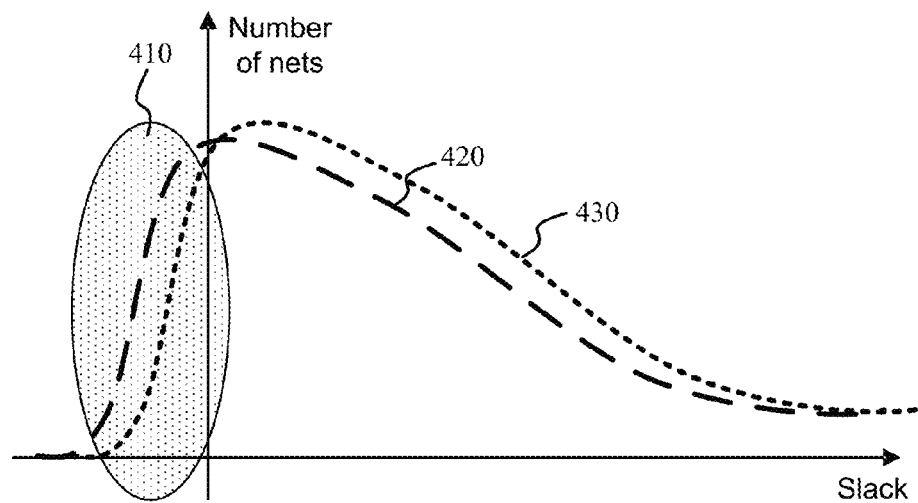
FIGS. 4A and 4B are graphs depicting the potential effects of one or more embodiments of the present invention on circuit performance and circuit design effort.
Figure 4B:
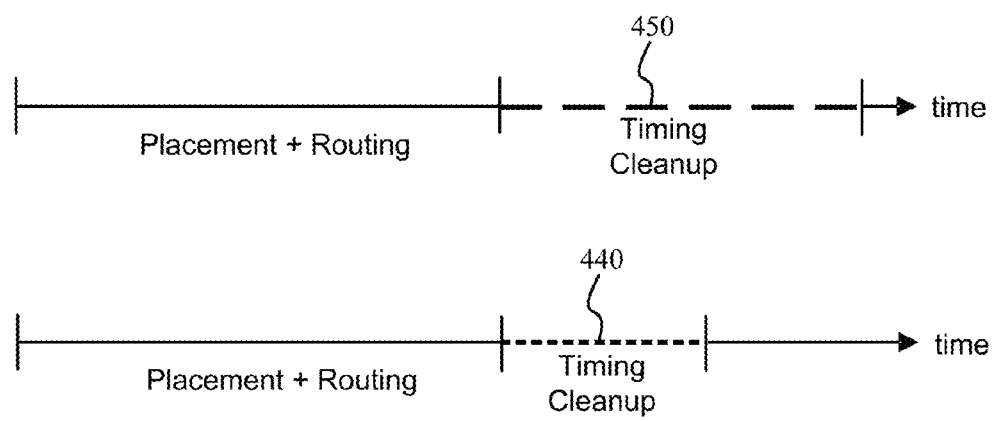

FIGS. 4A and 4B are graphs depicting the potential effects of one or more embodiments of the present invention on circuit performance and circuit design effort. As depicted in FIG. 4A, the embodiments disclosed herein may reduce the amount of negative slack in a routed circuit. For example, conventional circuit routing may result in a significant number of paths within a negative slack region 410 as depicted with a conventional slack distribution 420. However, by prioritizing routing according to total negative slack computed for each net in a circuit netlist, the overall negative slack of the entire circuit may be reduced resulting in an improved distribution 430. As shown in FIG. 4B, the reduction of the number of paths within the negative slack region 410, may reduce the amount of timing cleanup changes that must be made to a routed circuit. Consequently, an improved cleanup duration 440 may be significantly shorter than a conventional cleanup duration 450.

Figure 5:
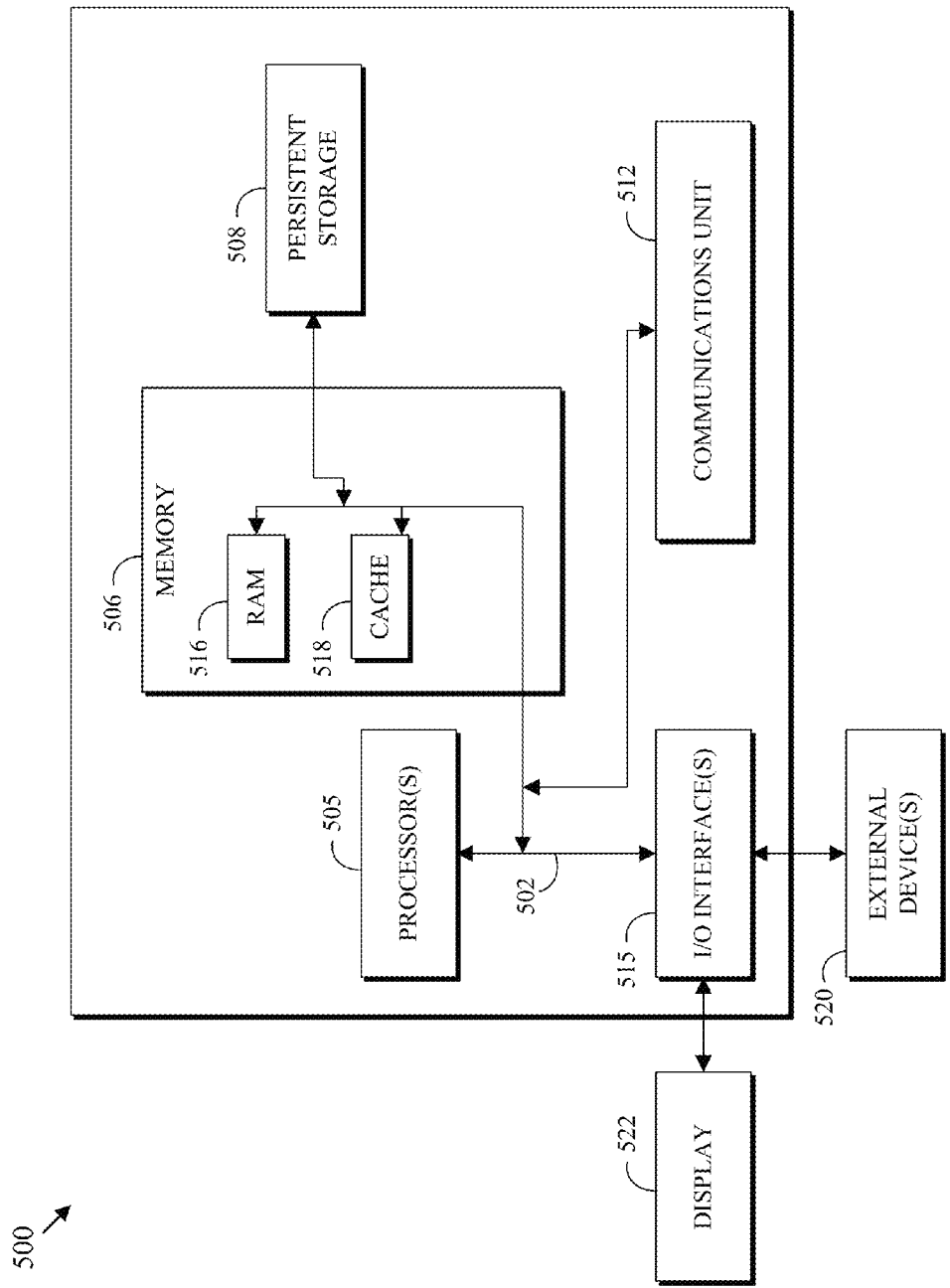
FIG. 5 is a block diagram depicting one example of a computing apparatus (i.e., computer) suitable for executing the methods disclosed herein.

FIG. 5 is a block diagram depicting one example of a computing apparatus (i.e., computer 500) suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computer program product for routing a circuit, the computer program product comprising:
   one or more computer readable storage media and program instructions stored on the one or more computer readable storage media, the program instructions comprising instructions to:
   partition a netlist for a circuit into a plurality of nets;
   determine a net cone corresponding to each net of the plurality of nets;
   compute a total negative timing slack for each net cone of the plurality of net cones;
   assign routing constraints for the plurality of nets according to the total negative timing slack for the corresponding net cones; and
   route the netlist according to the routing constraints.

2. The computer program product of claim 1, wherein the instructions to compute a total negative timing slack comprise instructions to conduct a timing analysis for the circuit.

3. The computer program product of claim 1, wherein the instructions to compute a total negative timing slack comprise instructions to subtract a slack target from an estimated timing slack for each path in a net cone.

4. The computer program product of claim 1, wherein the routing constraints include one or more of a routing priority, a routing weight, a scenic ratio, a wirecode assignment, and a layer assignment.

5. The computer program product of claim 1, wherein a net cone of the plurality of net cones corresponds to a driver.

6. The computer program product of claim 5, wherein the net cone comprises a set of paths connected to the driver.

7. The computer program product of claim 5, wherein the net cone comprises one or more nodes connected to the driver.

8. A computer system for routing a circuit, the computer system comprising:
   one or more computers;
   one or more computer readable storage media and program instructions stored on the one or more computer readable storage media for execution by at least one of the computers, the program instructions comprising instructions to:
   partition a netlist for a circuit into a plurality of nets;
   determine a net cone corresponding to each net of the plurality of nets;
   compute a total negative timing slack for each net cone of the plurality of net cones;
   assign routing constraints for the plurality of nets according to the total negative timing slack for the corresponding net cones; and
   route the netlist according to the routing constraints.

9. The computer system of claim 8, wherein the instructions to compute a total negative timing slack comprise instructions to conduct a timing analysis for the circuit.

10. The computer system of claim 8, wherein the instructions to compute a total negative timing slack comprise instructions to subtract a slack target from an estimated timing slack for each path in a net cone.

11. The computer system of claim 8, wherein the routing constraints include one or more of a routing priority, a routing weight, a scenic ratio, a wire code assignment, and a layer assignment.

12. The computer system of claim 8, wherein a net cone of the plurality of net cones corresponds to a driver.

13. The computer system of claim 12, wherein the net cone comprises a set of paths connected to the driver.

* * * * *